July 24, 1928.
F. K. EASTMAN
DOORCHECK
Filed July 2, 1926
1,678,499
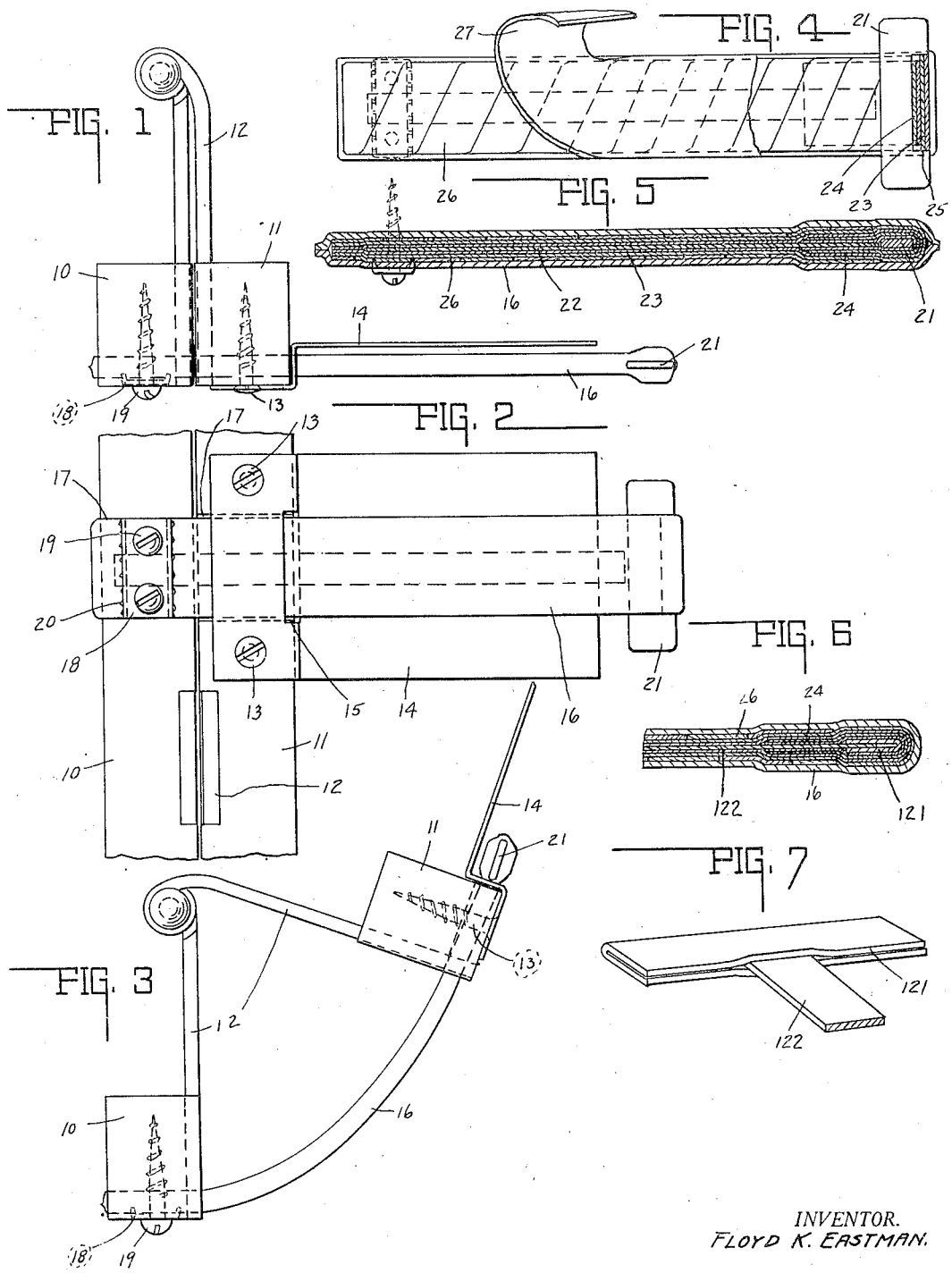
INVENTOR.
FLOYD K. EASTMAN.
BY Lockwood & Lockwood
ATTORNEYS.

Patented July 24, 1928.

1,678,499

UNITED STATES PATENT OFFICE.

FLOYD K. EASTMAN, OF KOKOMO, INDIANA, ASSIGNOR TO CONCEALED DOOR CHECK CO., OF KOKOMO, INDIANA, A CORPORATION.

DOORCHECK.

REISSUED

Application filed July 2, 1926. Serial No. 120,009.

This invention pertains to a door check particularly adapted for use in connection with automobile bodies or similar vehicles.

Heretofore varying types of checks have been used originating with the ordinary exposed loop strap which would loop outwardly from the door when in closed position and be secured at both ends to the surface of the door and body. Concealed checks have been employed wherein a cable or metallic member has been slidably secured within the frame work of the body and door so as to be entirely concealed when in closed position, as well as groove and slot checks mounted on the top of the door, such types requiring shock absorbing members and being relatively expensive of manufacture and installation.

The principal object of this invention is to provide a concealed check which will be little, if any more expensive than the ordinary strap; which will have sufficient resiliency and give to absorb the shock without provision of an additional shock absorbing member, and which will assume its proper position in the frame work of the door or body so as to avoid interference with the window actuating mechanism and take up a minimum of space.

The main feature of this invention resides in the details of construction of the strap and its anchoring and stop members, and particularly the angularly or spirally wound or taped plies of rubber or rubberized fabric employed in the building up of the strap for increasing the strength thereof and permitting the same to be anchored at one end to the vehicle body in such a manner as to prevent its being torn or ripped from the anchoring member as has been found possible in straps constructed in the ordinary manner, reference being made to an earlier application filed April 23, 1926, Serial No. 104,081.

A further feature of the invention resides in the provision of a suitable guard plate, associated with the check strap for limiting its movement and causing it to check the opening of the door, the particular feature of said plate being to guard against the strap interfering with the operating mechanism of the door or body, such as the window controls, by preventing it from curving inwardly when the door is moved to closed position.

The full nature of the invention will be understood from the accompanying drawings and the following description and claims.

Fig. 1 illustrates the door check strap as applied to a door in closed position. Fig. 2 is a front elevation thereof. Fig. 3 is the same as Fig. 1 showing the door structure in open position. Fig. 4 is a plan view of the strap with a portion thereof cut away and one layer raised to show the angular or spiral winding. Fig. 5 is an enlarged view through a longitudinal section of the check strap. Fig. 6 is a section through the cross head and the metal strip showing a modified form thereof wherein the metal strip extends into said cross head. Fig. 7 is a perspective view thereof.

In the drawings there is shown a pillar 10 of a body frame and a pillar 11 of a door frame connected by the hinge 12. Rigidly secured to the door pillar 11 by the screws 13 there is a protective plate 14 which is offset to embrace the corner of the pillar 11 as illustrated in Figs. 1 and 3, said plate being provided with a slotted opening 15 through which the door check strap 16 is adapted to extend. The pillars are provided with a recess 17 of the width and thickness of said strap whereby said strap may slidably extend between the adjacent plate 14 and the pillar 11 and may be secured flush with the pillar 10.

One end of the strap 16 is securely anchored to the pillar 10 by the anchor plate 18 through the medium of the screws 19, said anchor plate being provided with a plurality of teeth 20 adapted to extend into and grip the strap as will be hereinafter described. The relatively large offset portion of the plate 14 acts as a protection to the strap and the window mechanism of the door, for preventing the two from becoming accidentally engaged. On the other hand the shouldered portion of the plate 14 through which the strap extends, acts as a stop for engaging the cross head 21 of the strap checking further movement thereof with respect to the door upon the door being swung to its extreme open position as illustrated in Fig. 3.

The strap is formed, as best shown in Fig. 5, from a rubberized fabric core having a centrally positioned spring metal strip 22 embedded therein and extending from adjacent one end to adjacent the other end, substantially the full width of the strap. A plurality of longitudinally extending rubberized fabric strips 23 are secured adjacent each side of the surfaces of the metal strip 22, said strips overlapping the end of the metal strip at one end and being looped at a point beyond the metal strip at the other end. Within the looped portion of said strips there are a plurality of relatively short reinforcing looped strips 24 which, together with the looped ends of the strips 23 surround the metal cross head 21 fitting into a recessed portion 25 formed in one edge thereof. However, if desired, the reinforcing looped strips 24 may extend throughout the length of the strap for further increasing its strength and thickness.

Wound diagonally about the strips 23 there is a rubberized fabric strip 26 as shown in Fig. 4. The cords of the fabric in this strip at all times extend at an angle to both the horizontal and vertical planes through the cords of the strips 23. The covering 27 of vulcanizing rubber is laid over both sides of the strap as formed and the complete rubberized structure is then vulcanized into a solid door check strap as illustrated in Figs. 1, 2 and 3. However, in the vulcanizing process, there is no adhesion between the rubber strips 23 and the metal strap 22 whereby the rubberized cord and the imbedded metal strip will have relatively free action therebetween. This permits the door check strap to be capable of stretching or absorbing the shock in the checking action on the door, while at the same time, through the spring action of the metal strap, the door check will normally be held straight and returned to its normal position when the door is closed. The metal strap also serves to prevent buckling as well as guard against undue flexing such as to be detrimental to the wear of the fabric and the life of the door check.

It will be noted that the importance of the diagonally disposed winding of the fabric strip 26 lies in its strengthening action and particularly with respect to the securing of the strap through the medium of the anchor plate 18. The anchoring of the strap depends largely upon the projection therein of the teeth 20, which are formed to penetrate the rubberized cover strip 27 and extend into the next adjacent rubberized fabric strip. If the cords of the adjacent strip extended longitudinally of the check strap, the action of the penetrating teeth of the anchoring member would be such as to readily tear through the rubber with very little resistance from the longitudinally extending cords. Thus upon the door being violently jerked open, the anchored end of the check strap will tear free of the anchoring member. This difficulty with the method of anchoring the structure is partially eliminated by wrapping the inner strips in such a manner that the cords extend crosswise thereof whereby the teeth would pull directly against said cords. However, it was found that it still was possible to jerk the check strap loose from the anchor since only two cords would be engaged by the teeth. However, as shown herein, by extending the wrapping strip 26 diagonally, each tooth of the anchoring member engages and pulls substantially directly against a different cord of the fabric, and it has been found that by means of this arrangement it is practically impossible to pull or jerk the check strap loose from the anchor. It will therefore be noted that by means of the formation of the cord of the strap, and particularly the diagonal wrapping thereof, a very strong and substantial check strap is produced which may be firmly anchored in position and held securely against any jerk or pull due to the opening of the door.

As shown in Figs. 6 and 7, the cross head pin 121 is formed by folding the metal substantially U-shaped and having it spaced slightly apart at the center for receiving the end of the metal strip 122. This arrangement overcomes any possibility of the end of the metal strip eventually cutting through the fabric as may be possible wherein it merely abuts the inner edge of the cross head pin as illustrated in Figs. 1 to 5 inclusively. It will be noted in this connection that the end of the metal strip extends only partially into the cross head pin so as not to interfere with its longitudinal movement with respect thereto and with respect to the resilient strap, while at the same time the strip is prevented from direct engagement or any cutting action in connection with the fabric strap.

The invention claimed is:

1. A check strap of the character described, comprising a rubberized fabric body portion, a metal strip mounted therein, and a cross head pin secured at one end thereto and adapted to embrace one end of said metal strip while permitting said strip to have longitudinal movement with respect thereto.

2. A check strap of the character described, comprising a flexible body portion, a metallic cross head pin secured at one end thereof and provided with a recess and a metal strip mounted within said body portion and having one end loosely extending within the recess of said cross head.

3. A check strap of the character described comprising a flexible body portion, a metallic cross head secured at one end thereof and formed by doubling the metal on itself to provide a recess opening from the inner edge thereof, and a metal strip having one end extending loosely within said recess so as to be capable of longitudinal movement with respect to said cross head.

4. A check strap of the character described comprising a rubberized fabric body portion looped at one end, a metal strip mounted therein, and a cross head pin positioned in the looped end of said fabric body portion so as to protrude from either side thereof.

5. A check strap of the character described comprising a rubberized fabric body portion looped at one end thereof, a flexible metal strip mounted therein and extending substantially from one end of said strip to the other, and a cross head pin associated with said strip and positioned in the looped end of said body portion so that the ends thereof protrude beyond the edges of said strap.

6. A check for limiting the opening movement of a door comprising a fabric strap, an enlarged head secured to one end thereof, and a guard plate extending freely rearwardly into the interior of the door structure and associated with said strap for normally maintaining it in a substantially straight line while freely permitting the sliding movement thereof.

In witness whereof, I have hereunto affixed my signature.

FLOYD K. EASTMAN.